United States Patent
Turner et al.

(10) Patent No.: US 7,920,476 B2
(45) Date of Patent: Apr. 5, 2011

(54) NETWORK CONGESTION CONTROL

(75) Inventors: Yoshio Turner, Redwood City, CA (US); Gopalakrishnan Janakiraman, Sunnyval, CA (US); Jose Renato Santos, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2231 days.

(21) Appl. No.: 10/680,911

(22) Filed: Oct. 8, 2003

(65) Prior Publication Data
US 2005/0078603 A1 Apr. 14, 2005

(51) Int. Cl.
*G08C 15/00* (2006.01)
(52) U.S. Cl. ............... 370/236; 370/229; 370/230.1
(58) Field of Classification Search ......... 370/229, 370/230.1, 236
See application file for complete search history.

(56) References Cited

U.S. PATENT DOCUMENTS

| | | | |
|---|---|---|---|
| 6,842,424 B1 * | 1/2005 | Key et al. | 370/236 |
| 2004/0064577 A1 * | 4/2004 | Dahlin et al. | 709/235 |
| 2004/0223452 A1 * | 11/2004 | Santos et al. | 370/229 |

OTHER PUBLICATIONS

D. Bansal and H. Balakrishnan, "Binomial Congestion Control Algorithms," IEEE INFOCOM 2001, Twentieth Annual Joint Conference of the IEEE and Communications Societies, Apr. 22-26, 2001, vol. 2, pp. 631-640.

D. Chiu and R. Jain, "Analysis of the Increase/Decrease Algorithms for Congestion Avoidance in Computer Networks," Journal of Computer Networks and ISDN, vol. 17, No. 1, Jun. 1989, pp. 1-14.

* cited by examiner

*Primary Examiner* — Jason E Mattis

(57) ABSTRACT

A network controls congestion by monitoring how well packets are actually being received at their respective dataflow destinations. The destination nodes are outfitted with a monitor that returns an acknowledgement (ACK) datapacket to the source node for each reception. The return ACK datapackets are marked according to whether congestion was encountered in the delivery to the destination. If so, a rate limiter at the source node is signaled to slow down the data injection rate. If not, the rate limiter is signaled to dial up the injection rate. Several dataflows can be independently and simultaneously controlled this way.

13 Claims, 5 Drawing Sheets

NETWORK CONGESTION CONTROL

FIELD OF THE PRESENT INVENTION

The present invention relates generally to communication networks, and in particular to exploiting asynchronous network feedback for source responses executed in a source node of a network to control congestion in the network.

BACKGROUND OF THE PRESENT INVENTION

Network congestion develops when the datapacket traffic being sent or injected exceeds the capacity of the network. Congestion causes the throughput of useful traffic to be reduced because each datapacket holds onto network resources longer, or network resources are wasted by handling datapackets that are later discarded.

A conventional approach to minimizing network congestion uses closed-loop per-flow end-to-end rate control. Congestion feedback is used for updates about network congestion to a source of a traffic flow. A Boolean signal provided to the flow source indicates whether a set of datapackets injected for the flow experienced any network congestion. The source response mechanism adjusts a limit on the rate at which future datapackets of the flow can be injected into the network in response to each congestion feedback signal received for a flow at its source.

The congestion feedback signal may be implicit or explicit. An implicit signal is one detected at the source without support from the network switches. For example, in transport control protocol (TCP), an acknowledgment time-out at the source is used to detect datapacket losses. Such is interpreted as a signal of network congestion, and the reception of an acknowledgment (ACK) datapacket with an appropriate sequence number is interpreted as a signal indicating no congestion. In contrast, an explicit signal is generated by the switches in the network, for example by sending Explicit Congestion Notification (ECN) datapackets to flow end-devices.

Some congestion feedback mechanisms favor signaling only the high flow rate sources. For example, some mechanisms send congestion flags only when a switch datapacket buffer exceeds a certain level of occupancy, and the flows that receive the signals are those corresponding to datapackets present in a high occupancy buffer. If the number of datapackets that a buffer can store is less than the number of flows that use the corresponding link, then only some of the flows sharing the link will have datapackets in the buffer when it reaches the threshold occupancy.

A high rate flow is more likely to have a datapacket in the high occupancy buffer than a lower rate flow, because datapackets of the higher rate flow use the buffer more frequently than those of a lower rate flow. Therefore, when a switch buffer fills, among all the flows sharing the corresponding link, higher rates flows are more likely to receive a congestion flag than lower rate flows. Such bias in congestion signaling is strongest in network with small buffers that can store only a few datapackets, because then, when a buffer becomes highly occupied, the subset of flows represented in the buffer is likely only a small fraction of all the flows that share the corresponding network communication link.

The source response component of congestion control acts at the flow source end-device to control the flow's rate limit in response to signals provided by the congestion feedback mechanism. When a received feedback signal indicates no congestion, the source increases the flow's rate limit. The source receives an ACK datapacket that corresponds to one or more of its prior injected datapackets that experienced no congestion in the network. The increase is based on an increase function, $r_{new}=f_{inc}(r)$, where "r" is the current rate limit, and $r_{new}$ is the next rate limit setting for the flow. Similarly, on receipt of a congestion flag the source reduces the rate limit based on a decrease function, $r_{new}=f_{dec}(r)$.

The rate increase and decrease functions should be designed to operate together to enable flows to converge to an operating point that is efficient with high bandwidth utilization, and fair, e.g., approximately equal rates to each flow sharing the same bottleneck link.

In networks that use biased congestion feedback mechanisms, a high rate flow is more likely than any contending lower rate flow to receive a congestion flag each time a buffer becomes highly occupied. In such networks, if an update occurs for each congestion feedback signal, then higher rate flows perform more frequent rate decrease steps than lower rate flows.

It is an object of the present invention to enable the use of source responses that use faster increase responses in asynchronous network environments, leading to increased network utilization while still achieving convergence to efficient and fair operating points.

SUMMARY OF THE PRESENT INVENTION

Briefly, a network embodiment of the present invention controls congestion by monitoring how well packets are actually being received at their respective dataflow destinations. The destination nodes are outfitted with a monitor that returns an acknowledgement (ACK) datapacket to the source node for each reception. The return ACK datapackets are marked according to whether congestion was encountered in the delivery to the destination. If so, a rate limiter at the source node is signaled to slow down the data injection rate. If not, the rate limiter is signaled to dial up the injection rate. Several dataflows can be independently and simultaneously controlled this way.

DETAILED DESCRIPTION OF THE EMBODIMENTS

Figure 1:
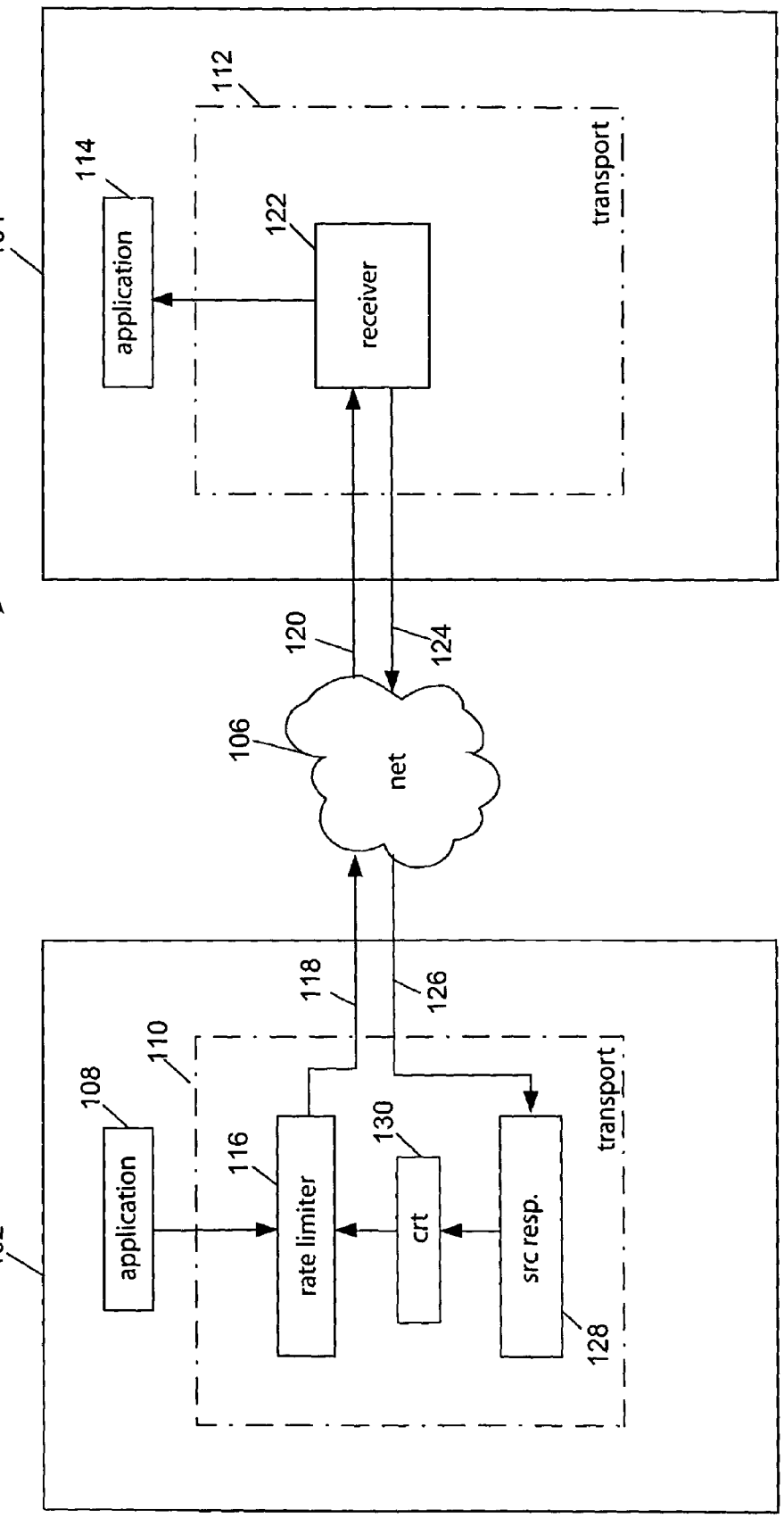
FIG. 1 is a block diagram of a network embodiment of the present invention.

FIG. 1 represents a network environment 100 in which a source server 102 communicates with a destination client 104 via a network 106. For example, the network may include the Internet. Embodiments of the present invention operate in such network environments 100. A computer software application 108 running on source server 102 injects or flows datapackets through a transport layer 110 across the network 106 to a corresponding transport layer 112 on the receiver side. Such traffic ultimately flows to a receiving computer software application 114. Each source server 102 and destination client 104 can simultaneously support multiple such flows.

Datapackets from the application 108 are passed down through the transport layer 110 of the sender's communication protocol stack. The incoming datapacket is passed along to receiving application 114 for processing. The rate of datapacket injection into the network is controlled by a rate limiter 116. An appropriate rate limit is determined and enforced for each flow. A datapacket receiver network interface 122 generates an acknowledgment (ACK) datapacket automatically each time it receives an incoming datapacket. The ACK is returned to source server 102.

A rate limit for each flow is represented at source server 102 by a state variable "crt". A separate "crt" state variable is updated for each flow. Each ACK datapacket received on path 126 over network 106 is passed to an acknowledgement monitor 128. The value of a "crt" state variable 130 is updated and maintained for each corresponding flow. The acknowledgement monitor 128 determines whether the relevant flow to which the ACK datapacket relates is contributing to any congestion in the network 106.

Such determination can be based on when the ACK datapacket is actually received, or based on information coded within it. The acknowledgement monitor 128 may rely on explicit congestion notification (ECN) techniques. If congestion is detected, the acknowledgement monitor 128 decreases the value of the corresponding flow's rate limit "crt". Otherwise, the acknowledgement monitor 128 infers from an apparent lack of congestion that there is available capacity within the network. It increases the rate limit "crt" to allow the rate limiter 116 to set a higher rate of injection into the network for the relevant flow.

The operation of the acknowledgement monitor 128 is particularly suited to application to the INFINIBAND standard. The INFINIBAND Architecture is an industry standard, channel-based, switched fabric, interconnect architecture for servers. INFINIBAND architecture dictates a new way servers are to be built, deployed, and managed.

In any network environment, a primary goal is to minimize or avoid network congestion and achieve fairness for contending flows. Such results in higher network utilization than was previous possible.

Embodiments of the present invention allow source responses in a network source node, e.g., source server 102, to increase and decrease flow rate ($f_{inc}(r)$ and $f_{dec}(r)$), to exploit congestion signaling bias in order to improve performance.

A method embodiment of the present invention provides for controlling a plurality of datapacket flows into a network. Such is based on an asynchronous rate control procedure, receiving network congestion feedback, and adjusting a datapacket injection rate of each of the datapacket flows based on the congestion feedback. The datapacket injection rates are adjusted according to a rate increase function when the congestion feedback indicates no congestion. Following any decrease in the datapacket injection rate, the datapacket injection rate is incremented. The period set for such increases is at least the inverse of the minimum injection rate.

Method embodiments of the present invention provide network source node responses which converge to fair and efficient network operating points. Source responses include fast increase multiplicative decrease (FIMD), and linear inter-datapacket delay (LIPD).

Conventional designs provide convergence under the synchronous update assumption by using conservative responses to congestion feedback signals. Embodiments of the present invention exploit the datapacket marking bias of asynchronous updates to weaken the conditions for fairness convergence. The weakened conditions enable the use of responses that do not improve fairness in a synchronous scenario. The FIMD and LIPD source responses reclaim bandwidth more rapidly than responses that have the same decrease behavior but satisfy the stronger conditions for rate increase. Quicker reclamation of bandwidth using the new functions yields higher network bandwidth and throughput, especially in dynamic environments in which flows come and go.

In the example congestion feedback mechanism, the network uses datapacket marking to provide a congestion flag. Such is a form of forward explicit congestion notification (FECN). Whenever a switch buffer reaches a state of high occupancy, all the datapackets within the buffer are marked. The datapacket marks are returned by a flow's destination node to the flow's source node by marked ACK datapackets. A signal indicating no congestion is communicated to the flow's source node by unmarked ACK datapackets.

The source response mechanism controls the injection of datapackets into the network based on the information provided by the congestion feedback mechanism. On receipt of a congestion feedback signal indicating no congestion, the source increases the flow's rate limit based on an increase function, $r_{new}=f_{inc}(r)$, where "r" is the current rate limit, and $r_{new}$ is the next rate limit setting for the flow. The source reduces the rate limit based on a decrease function, $r_{new}=r_{dec}(r)$ on receipt of a feedback congestion flag.

In the absence of marks, it is desirable for the rate to gradually increase over time. Let $F^r_{inc}(t)$, for $t \geq 0$, be a family of continuous monotonic increasing functions, each of which describes the desired flow rate increase behavior as a function of time since the last rate decrease to an arbitrary rate $F^r_{inc}(0)=r$ ($R_{min} \leq "r" \leq R_{max}$, where $R_{min}$ and $R_{max}$ are the minimum and maximum values for a flow rate in datapackets/sec, respectively. $R_{min}$ and $R_{max}$ are constants for a particular network and implementation. The value of $R_{max}$ will typically equal the full bandwidth of the network link (e.g., if the link is ten gigabits per second, $R_{max}$ will also be ten gigabits per seconds). $R_{min}$ can be any value that is less than $R_{max}$ and greater than zero and it refers to the lowest rate limit that the implementation of the sending node can support. Determination of $R_{min}$ and $R_{max}$ is based on the notion that the rate control implementation can support only a finite set of rates, for example because the rate is represented digitally using a finite-width register. $R_{min}$ is the smallest value in the finite set of supported rates. The particular values of $R_{max}$ and $R_{min}$ for a network rate control implementation will be known or readily determined by the network designer and can be factored into the design of the source responses. Since the increase function $f_{inc}(r)$ is defined as a function of the current rate, the time behavior of the rate increase should be independent of the past history of the flow rate, e.g., it should be independent of the elapsed time since the last decrease. Therefore, the time behavior of the rate for two arbitrary initial rates $r_1$ and $r_2$, ($R_{min} \leq r_1 < r_2 \leq R_{max}$), should be identical for rates "r">$r_2$, i.e.:

$$F^{r_2}_{inc}(t)=F^{r_1}_{inc}(t+t')$$

for $t \geq 0$, and $t'$ such that [1]

$F^{r_1}_{inc}(t')=r_2$.

It follows that the rate increase behavior can be represented by just one member of the family of functions: $F_{inc}(t)=F^{Rmin}_{inc}(t)$. All other functions $F^r_{inc}(t)$, for $R_{min} \leq "r" \leq R_{max}$, can be obtained by shifting the time origin of $F_{inc}(t)$, as described in Equation [1].

A recovery time/time duration $T_{rec}(r)$ is defined for a flow at rate "r" as the time elapsed from the time the flow rate is decreased from rate "r", due to a marked ACK, until the time the flow rate recovers to its original rate "r", assuming no other marked ACK is received until rate "r" is achieved.

If the recovery time or time duration of a lower rate flow is longer than that of a higher rate flow, flow rates may diverge and the higher rate flow may take over the entire bottleneck bandwidth, creating an unfair operating point. To avoid this situation and promote fair allocation of bandwidth, source responses must satisfy the relaxed convergence requirement, $$T_{rec}(r_1) = T_{rec}(r_2) = T_{rec} = 1/R_{min}(R'_{min} < r_1 < R_{max}, R'_{min} < r_2 < R_{max}),$$  [2]

where $f_{dec}(R'_{min}) = R_{min}$.

The recovery time is a constant $1/R_{min}$ for all rates higher than $R'_{min}$. Such is the highest rate from which a single decrease step assigns to a flow the minimum rate $R_{min}$. In the case of a synchronous network feedback for rate decrease, the result of satisfying the property in [2] is that any two flows, with rates $r_1$ and $r_2$ before the rate decrease, will recover to their original rates $r_1$ and $r_2$ at the same time. Therefore, after the recovery, fairness is not decreased but only maintained. While the Chiu and Jain, and the Bansal and Balakrishnan conditions require that fairness be strictly improved in a sequence of decrease/increase phases assuming a synchronous feedback scenario, the presently formulated condition requires only that fairness be maintained in the same scenario.

The choice of $1/R_{min}$ for $T_{rec}$ follows from the following argument. At the minimum rate $R_{min}$, the interval of time between two consecutively transmitted datapackets is $1/R_{min}$. Thus the expected time interval between the reception of two consecutive ACK's is also $1/R_{min}$. Therefore, assuming a marked ACK causes the rate to be decreased from rate $R'_{min}$ to the minimum rate $R_{min}$, the next rate change can only occur when the next ACK is received, i.e. after an expected time $1/R_{min}$. Therefore the minimum possible recovery time for rate $R'_{min}$ is $1/R_{min}$ (assuming the magnitude of an increase step cannot exceed the magnitude of a decrease step). Since the same recovery time is desired for any rate "r", $1/R_{min}$ is the minimum possible recovery time for any rate "r", $R'_{min} \leq$ "r" $\leq R_{max}$. In order to reclaim unused bandwidth as fast as possible, $1/R_{min}$ is chosen as this minimum value for the recovery time $T_{rec}(r)$ for any rate "r", $R'_{min} <$ "r" $< R_{max}$.

In order to achieve relaxed convergence requirement, the time behavior of a flow rate $F_{inc}(t)$ should satisfy the following condition (difference equation):

$$F_{inc}(t) = f_{dec}(F_{inc}(t+T_{rec})), \text{ or}$$

$$F_{inc}(t) = f_{dec}(F_{inc}(t+1/R_{min}))$$  [3]

This condition requires that after a decrease event, the increase function recovers the rate limit back to the particular rate prevalent prior to the decrease event in time $1/R_{min}$. Such is the constant recovery time $T_{rec}$ from relaxed convergence requirement, Equation [2].

Figure 2:
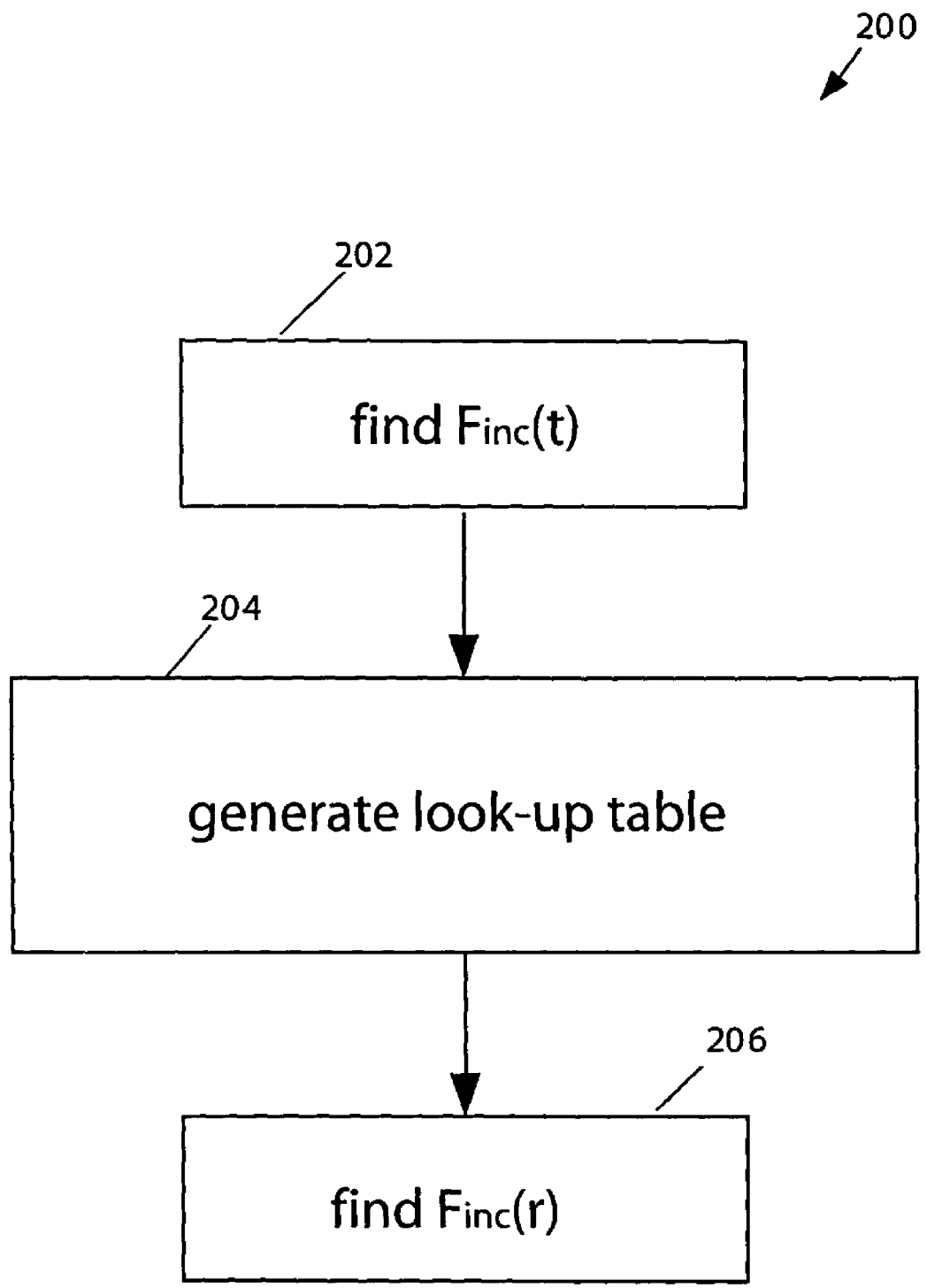
FIG. 2 is a flowchart diagram of a rate increase determination process embodiment of the present invention.

FIG. 2 represents a rate increase determination process embodiment of the present invention, and is referred to herein by the general reference numeral 200. Given an arbitrary decrease function $f_{dec}(r)$, process 200 determines $f_{inc}(r)$ such that relaxed convergence requirement is satisfied. In a step 202, a continuous monotonically increasing function $F_{inc}(t)$ is found that is a solution for the difference equation described in [3]. Such can be done using conventional techniques for solving difference-differential equations. Then all other functions $F^r_{inc}(t)$ are obtained, for an arbitrary rate "r", shifting the time origin of $F_{inc}(t)$, according to Equation [1]. At step 204, these functions are used to generate a look-up table for all possible settings of "crt". Given $F^r_{inc}(t)$, the increase function $f_{inc}(r)$ is obtained at step 206. At a given rate "r", the expected interval between consecutive datapackets, and thus between consecutive ACK datapackets is $1/r$. Assuming that at the previous adjustment the flow rate is set to "r", the next rate adjustment will occur at the reception of the next ACK, e.g., after an expected time $1/r$. Thus, $f_{inc}(r) = F^r_{inc}(1/r)$, with a ceiling of $R_{max}$, $$f_{inc}(r) = \min(F^r_{inc}(1/r), R_{max})$$  [4]

In order that the increase function does not cause the injection rate to exceed the maximum injection rate $R_{max}$, the lesser of the newly calculated increased rate and $R_{max}$ is chosen as the new rate.

At source server 102, the acknowledgement monitor 128 implements the rate increase and decrease functions. To ensure rapid response to changes in network conditions, it is important that the implementation of this logic module be fast enough to adjust the value of the rate limit "crt" each time an ACK datapacket arrives from the network 106. In a high speed network, the time between consecutive ACK datapacket arrivals at a source node may be very short, for example in the order of a few tens or hundreds of nanoseconds. Since the decrease and increase functions may be complex mathematical expressions involving time-consuming computational operations such as floating point division or exponentiation, there may not be sufficient time to calculate the function outputs unless specialized and expensive hardware is provided. As a less costly alternative, the output of each function can be pre-computed for all possible settings of "crt" and these outputs can be stored in a memory look-up table indexed according to "crt" value.

During operation, the acknowledgement monitor 128 can then determine the correct rate adjustment and corresponding new "crt" value by performing a fast access to the appropriate look-up table in memory. Such look-up table is effectively part of the functional block of the acknowledgement monitor 128, although it may not have exactly the same location in hardware.

The fast increase multiplicative decrease (FIMD) source response function uses a multiplicative rate decrease function is adopted. Such is the same decrease function used by the traditional additive increase multiplicative decrease (AIMD) function, $f_{dec}(r) = \text{Max}(r/m, R_{min})$, where $m > 1$ is constant From Equation [3], $F_{inc}(t)$ must satisfy, $F_{inc}(t+T_{rec}) = m^* F_{inc}(t)$.

A continuous monotonically increasing function that satisfies this condition with, $F_{inc}(0) = R_{min}$, is $F_{inc}(t) = R_{min} * m^{t/Trec}$. For any rate "r", $R_{min} \leq r \leq R_{max}$, there exists a t' for which "r" $= F_{inc}(t') = R_{min} * m^{t'/Trec}$. Therefore, $$F^r_{inc}(t) = F_{inc}(t+t') = R_{min} * m^{t'/Trec} * m^{t/Trec} = \text{"r"} * m^{t/Trec}$$

and $$f_{inc}(r) = \text{Min}(F^r_{inc}(1/r), R_{max}) = \text{Min}(r * m^{1/(r*Trec)}, R_{max}) = \text{Min}(r * m^{R_{min}/r}, R_{max}).$$

Figure 3:
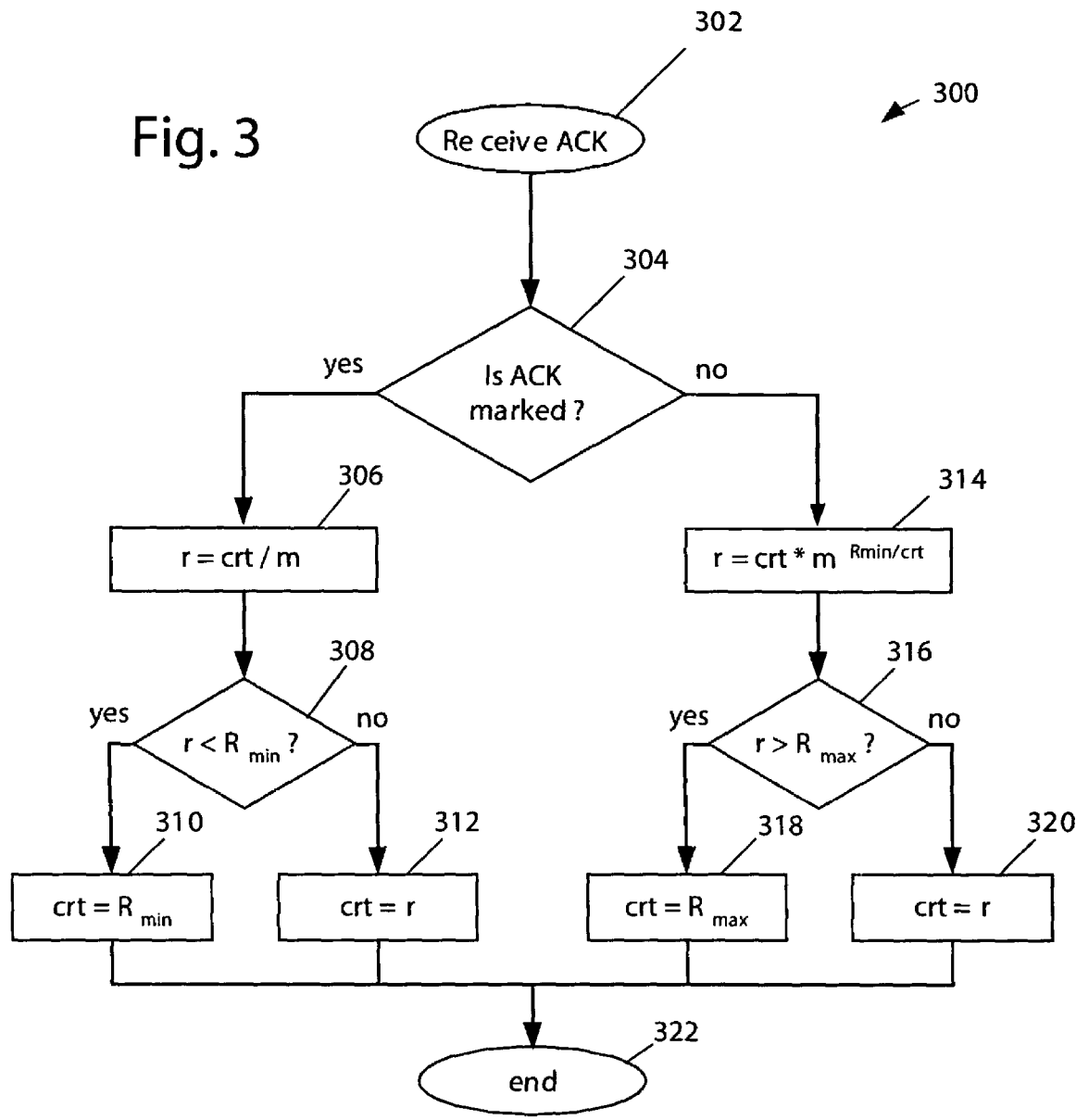
FIG. 3 is a flowchart diagram of a congestion flow rate increase/decrease method embodiment of the present invention.

FIG. 3 represents a procedure 300 used by an FIMD source response mechanism. A flow source end-device or node increases and decreases a flow's rate limit in response to congestion feedback. Procedure 300 reads and writes the value of a state variable "crt". Such records the current rate limit setting for a flow. In a hardware implementation of the source response mechanism, the "crt" variable may be implemented as a hardware register. Another procedure at the source end-device reads the value of "crt" and prevents datapackets for the flow from being injected into the network at a higher rate than the value of crt specifies. In a step 304, an ACK datapacket just received is checked to see if it is marked.

A marked ACK datapacket indicates congestion, so the source reduces the rate limit "crt" by a multiplicative constant, m>1 at step 306. In a step 308, an updated rate "r" is then checked against the minimum injection rate $R_{min}$. If the new rate is less than $R_{min}$, "crt" is assigned the value of $R_{min}$ at step 310. If the new rate is not less than $R_{min}$, "crt" is assigned the value of the new rate at step 312.

If an unmarked ACK is received, the source increases the rate limit "crt" by a multiplicative constant, $m^{R_{min}/crt}$, at step 314. The increased rate is then compared against the maximum injection rate, $R_{max}$, at step 316. If the new rate is greater than $R_{max}$, "crt" is assigned the value of $R_{max}$ at step 318. If the new rate is not greater than $R_{max}$, "crt" is assigned the value of the new rate at step 320.

Once the state variable "crt" is assigned the appropriate new rate according to the above steps, the update procedure is ended at step 322 and awaits receipt of a new ACK datapacket at 302 to repeat the update procedure 300.

The LIPD response function is based on a decrease function that increases inter-datapacket delay (IPD) linearly. IPD is the idle period length that is inserted between the injections of consecutive datapackets of a flow, expressed in units of datapacket transmission time. A flow operating at an IPD of "ipd" corresponds to a flow rate of $R_{max}/(1+$"ipd"$)$. A flow's rate decrease is defined as an increment by one of the flow's IPD value (which increases the inter-datapacket delay by one datapacket transmission time). Such rate decrease function is intuitively attractive for the following reason. If "n" identical flows share a bottleneck link, the optimal rate for each flow is $R_{max}/n$, where the IPD is equal to n−1.

If a new flow is introduced to a link that already has "n" flows that are operating at optimal rate, than one datapacket from each of the "n" original flows receives a mark and each one has its rate limit reduced from $R_{max}/n$ to the new value $R_{max}/(n+1)$. Such becomes the new optimal rate limit for these flows. With a decrease function based on incrementing the IPD by one, when a new flow is introduced, the flow rates of the previously resident flows converge in one decrease step to the new optimal rate value. This, instead of oscillating and slowly converging to the new optimal rate value, as they would with conventional decrease functions. Also, at lower rates this function decreases the rate by smaller steps than a multiplicative decrease function, e.g., FIMD and AIMD.

When several dynamic flows share a link, smaller decrease steps lower oscillation amplitude and improve overall link utilization. The rate decrease function can be derived using the inverse relationship of flow rate to the flow IPD, e.g., $$f_{dec}(r) = \text{Max}(R_{max}/(1+R_{max}/r), R_{min})$$

From Equation 3, $F_{inc}(t)$ must satisfy, $$F_{inc}(t+T_{rec}) = R_{max}/(R_{max}/F_{inc}(t)-1).$$

A continuous monotonically increasing function that satisfies this condition with $F_{inc}(0)=R_{min}$, is, $$F_{inc}(t) = R_{max}/(R_{max}/R_{min}-t/T_{rec}).$$

For any rate r, $R_{min} \leq r \leq R_{max}$, there exists a t' for which $r = F_{inc}(t') = R_{max}/(R_{max}/R_{min}-t'/T_{rec})$. Therefore, $$F_{inc}^r(t) = F_{inc}(t+t') = R_{max}/(R_{max}/R_{min}-t'/T_{rec}-t/T_{rec})$$
$$= R_{max}/(R_{max}/F_{inc}(t')-t/T_{rec})$$
$$= R_{max}/(R_{max}/r-t/T_{rec})$$

and, $$f_{inc}(r) = \text{Min}(F_{inc}^r(1/r), R_{max})$$
$$= \text{Min}(R_{max}/(R_{max}/r-1/(r*T_{rec})), R_{max})$$
$$= \text{Min}(R_{max}/(R_{max}/r-R_{min}/r), R_{max})$$
$$= \text{Min}(r/(1-R_{min}/R_{max}), R_{max}).$$

Figure 4:
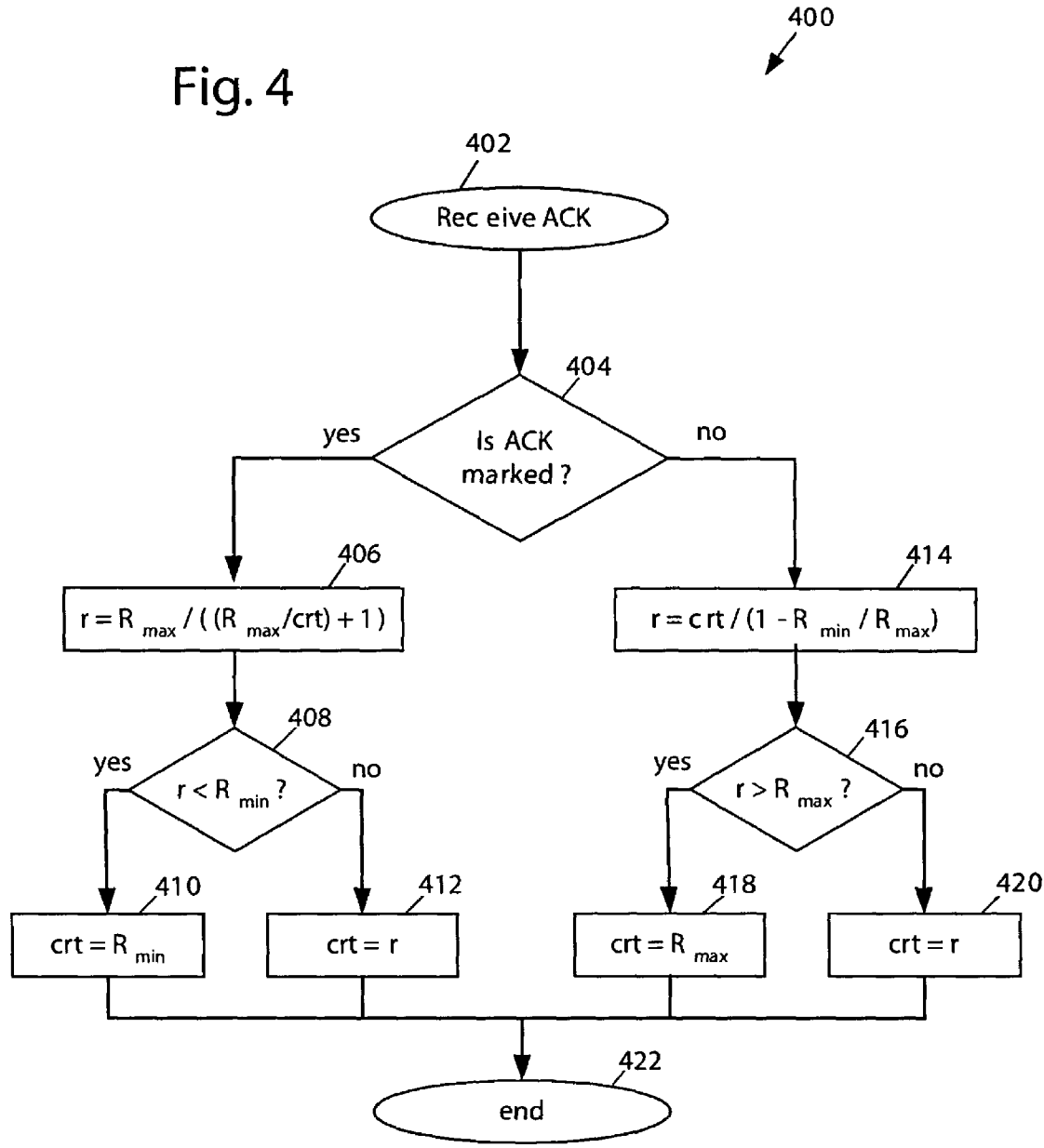
FIG. 4 is a flowchart diagram of a rate update method embodiment of the present invention.

FIG. 4 represents a procedure 400 used by a LIPD source response mechanism at a flow source end-device (node) to increase and decrease a flow's rate limit in response to congestion feedback. Such is similar in nature to update procedure 300 (FIG. 3). Procedure 400 reads and writes the value of a state variable "crt". Such records the current rate limit setting for the flow. Such description assumes the existence of another procedure at the source end-device that reads the value of "crt" and prevents datapackets for the flow from being injected into the network at a higher rate than the value of "crt" specifies. At step 402 an ACK datapacket is received and, at step 404, it is checked to determine whether it is marked. If it is a marked ACK datapacket, indicating congestion, the source reduces the rate limit "crt", at step 406, to a value that corresponds to an increase of the inter-datapacket delay by one unit of datapacket transmission time $1/R_{max}$. The updated rate "r" is then checked against the minimum injection rate $R_{min}$ at step 408. If the new rate is less than $R_{min}$, "crt" is assigned the value of $R_{min}$ at step 410. If the new rate is not less than $R_{min}$, "crt" assigned the value of the new rate at step 412.

If it is an unmarked ACK datapacket, the source increases the rate limit "crt" at step 414. The new value decreases inter-datapacket delay by a fraction $R_{min}/r$ of one datapacket transmission time $1/R_{max}$. The increased rate is then compared against the maximum injection rate, $R_{max}$, at step 416. If the new rate is greater than $R_{max}$, crt is assigned the value of $R_{max}$ at step 418. In a step 420, if the new rate is not greater than $R_{max}$, crt is assigned the value of the new rate.

Figure 5:
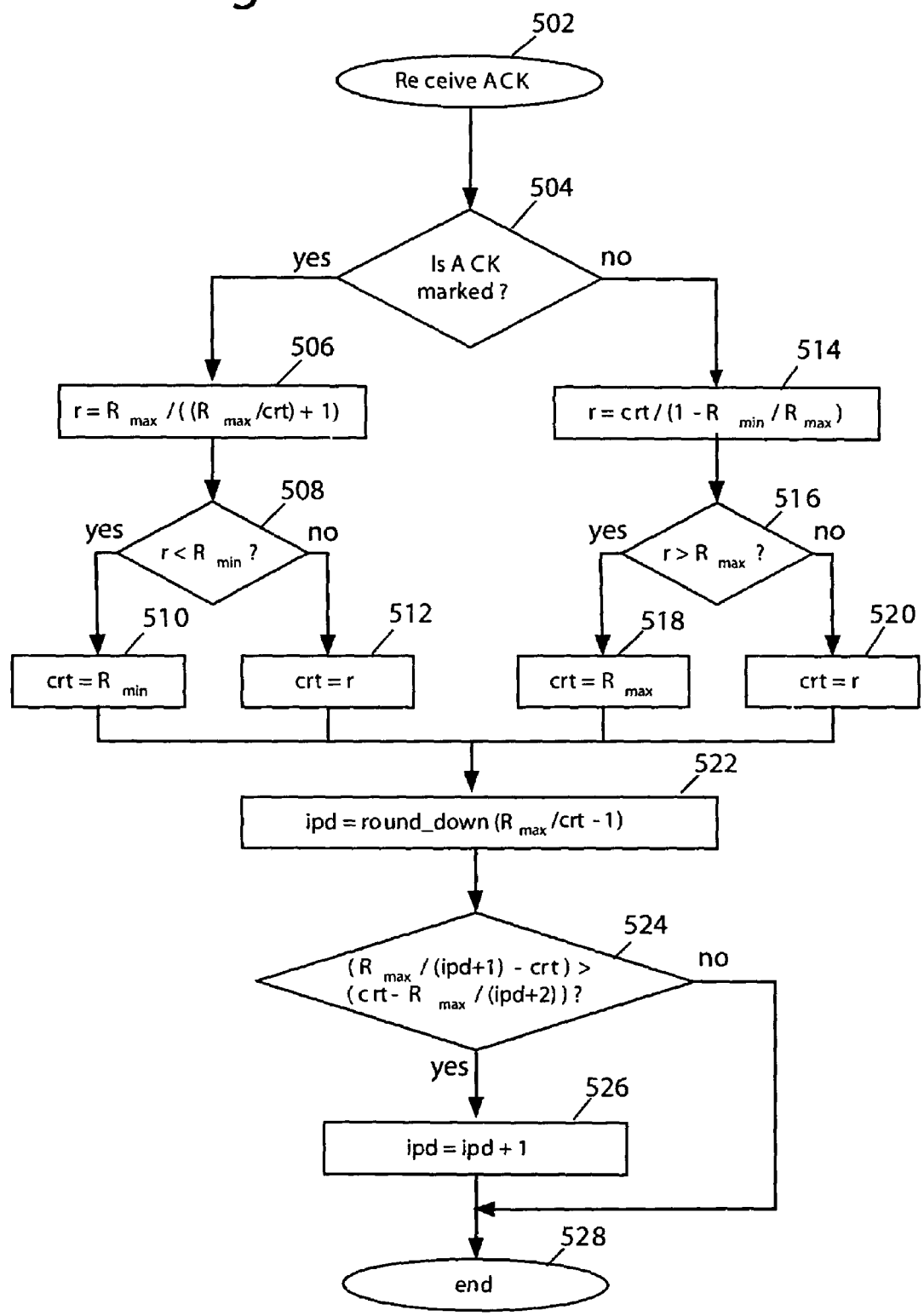
FIG. 5 is a flowchart diagram of a rate update method embodiment of the present invention.

FIG. 5 represents how the LIPD source response mechanism could be deployed in an INFINIBAND, or other network. The network controls the rate limit for a flow by using an integer state variable "ipd". Such specifies the number of idle datapacket transmission times to insert before transmitting each datapacket. Such description describes how to set the value of "ipd", but it is assumed that another procedure at the source end-device 102 is operating that reads the value of "ipd" and inserts the delay that it specifies for the flow after each of the datapackets is injected into the network. The LIPD procedure applied to INFINIBAND is similar to that described in relation to FIG. 4, except for extra steps (522 to 528) at the end. Such set "ipd" to an integer value that yields a rate that is closest to the ideal rate limit. Such is represented by variable "crt".

FIG. 5 represents a rate update procedure 500 for the LIPD source response function implemented on a network conforming to the INFINIBAND standard. Steps 502 to 520 are similar to steps 402 to 420 (FIG. 4). After a step 522, the inter-datapacket delay, "ipd", corresponding to rate "crt" is computed and rounded down to the closest integer value. The maximum injection rate, $R_{max}$, is divided by "crt" and then subtracting one.

The rate of a flow can be mathematically represented as $R_{max}/(ipd+1)$. In a step 524, the error in the flow rate due to the rounding down of "ipd" is calculated, given by ($R_{max}/(ipd+1)-crt$). Such error value from the rounding down of "ipd" is compared with the error in the rate which would occur if the "ipd" were rounded up (given by crt−$R_{max}$/(ipd+2)). Thus if the error from rounding down the ipd is greater than that from rounding it up, the ipd is incremented by one at step 526. Otherwise, the rounded down ipd is considered to be correct, and the update procedure 500 finishes at step 528. Steps 522-528 ensure the inter-datapacket delay is an integer value.

In one embodiment, the present invention provides a method for controlling a plurality of datapacket flows into a network based on asynchronous rate control procedure. The method comprises receiving network congestion feedback and adjusting a datapacket injection rate of each of the datapacket flows based on the congestion feedback. The adjusting comprises increasing the datapacket injection rate according to a rate increase function if the congestion feedback indicates no congestion. Following any decrease of the datapacket injection rate, the datapacket injection rate is increased to the particular rate in a time duration which is at least the inverse of a predetermined minimum injection rate.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the present invention.

What is claimed is:

1. A method for network bandwidth utilization, comprising:
    limiting a flow rate of a particular dataflow injected in a network from a dataflow source to a particular rate, r;
    receiving return datapackets, at the dataflow source from a dataflow destination, with marks that indicate network congestion;
    increasing the flow rate of said particular dataflow according to an increase function if the marks of the return datapackets indicate no network congestion; and
    decreasing the flow rate of said particular dataflow according to a decrease function if the marks of the return datapackets indicate network congestion,
    wherein a recovery time is a duration of time elapsed from the time the flow rate is decreased from the particular rate r due to network congestion, until the time the flow rate recovers to the particular rate r, and
    wherein the increase function is based at least on the particular rate r and is adapted to recover the flow rate of the particular dataflow to the particular rate r over a period of time after a decrease in the flow rate, such that the recovery time is a constant value for at least two different flow rates, regardless of differing amounts by which the at least two different flow rates are decreased due to network congestion.

2. The method of claim 1, wherein:
    said increasing function is mathematically represented as,
    $f_{inc}(r) = Min(r*m^{Rmin/r}, R_{max})$,
    where,
    r is the particular rate;
    $f_{inc}(r)$ is the increase function;
    m is a constant greater than one;
    $R_{min}$ is a predetermined minimum injection rate;
    $R_{max}$ is a predetermined maximum injection rate; and
    Min ( ) is a ceiling function.

3. The method of claim 1, wherein:
    said decreasing function is mathematically represented as,
    $f_{dec}(r) = Max(r/m, R_{min})$, where:
$f_{dec}(r)$ is the decrease function;
r is the particular rate;
m is a constant greater than one;
$R_{min}$ predetermined minimum injection rate; and
Max ( ) is a floor function.

4. The method of claim 1, wherein:
    the step of decreasing is such that said decreasing function linearly enlarges an inter-datapacket delay.

5. The method of claim 1, wherein:
    the step of increasing is such that said increasing function linearly reduces an inter-datapacket delay.

6. The network source node of claim 4, wherein:
    the increase function is mathematically represented as:
    $f_{inc}(r) = Min(r/(1-R_{min}/R_{max})$
    where:
    r is the particular rate;
    $f_{inc}(r)$ is the increase function;
    $R_{min}$ is a predetermined minimum injection rate;
    $R_{max}$ is a predetermined maximum injection rate; and
    Min ( ) is a ceiling function.

7. The network source node of claim 5, wherein:
    the decrease function is mathematically represented as:
    $f_{dec}(r) = Max(R_{max}/(1+R_{max}/r), R_{min})$
    where:
    r is the particular rate;
    $f_{dec}(r)$ is the decrease function;
    $R_{min}$ is a predetermined maximum injection rate;
    $R_{max}$ is a predetermined maximum injection rate; and
    Max ( ) is a floor function.

8. A network, comprising:
    a source node for injecting a dataflow of datapackets at a flow rate of a particular rate r to a destination node;
    a rate controller associated with the source node and able to control the flow rate of injection of said datapackets;
    a congestion monitor associated with the destination node, for receiving acknowledgement datapackets from the destination node, providing an assessment of whether said datapackets injected from the source node experienced network congestion in their travels from the source node to the destination node, and providing a feedback signal to the rate controller related to such assessment;
    wherein, the rate controller is responsive to said feedback signal and adjusts said flow rate of injection of said datapackets to minimize congestion and maximize data throughput,
    wherein a recovery time is a duration of time elapsed from the time the flow rate is decreased from the particular rate r due to network congestion, until the time the flow rate recovers to the particular rate r, and
    wherein the rate controller is adapted to use an increase function, based at least on the particular rate r, to recover the flow rate of injection of the dataflow to the particular rate r over a period of time after a decrease in the flow rate, such that the recovery time is a constant value for at least two different flow rates, regardless of differing amounts by which the at least two different flow rates are decreased due to network congestion.

9. The network of claim 8, wherein:
    the congestion monitor receives an acknowledgement (ACK) datapacket from the destination node for each datapacket the destination node receives from the source node.

10. The network of claim 9, wherein:
    the ACK datapackets are marked according to whether congestion was encountered in the delivery to the destination node.

11. The network of claim 8, wherein:

the rate controller is such that several dataflows can be independently and simultaneously controlled.

12. The network of claim 8, wherein:

the rate controller is adapted to increase the flow rate of the dataflow according to the increase function mathematically represented as, $f_{inc}(r) = \text{Min}(r*m^{Rmin/r}, R_{max})$, where, r is the particular rate;

$f_{inc}(r)$ is the increase function;

m is a constant greater than one;

$R_{min}$ is a predetermined minimum injection rate;

$R_{max}$ is a predetermined maximum injection rate; and

Min ( ) is a ceiling function.

13. The network of claim 8, wherein:

the rate controller is adapted to decrease the flow rate, when the assessment indicates network congestion, according to a rate decrease function mathematically represented as, $f_{dec}(r) = \text{Max}(r/m, R_{min})$, where:

$f_{dec}(r)$ is the rate decrease function;

r is the particular rate;

m is a constant greater than one;

$R_{min}$ predetermined minimum injection rate; and

Max ( ) is a floor function.

* * * * *

UNITED STATES PATENT AND TRADEMARK OFFICE
CERTIFICATE OF CORRECTION

| | | |
|---|---|---|
| PATENT NO. | : 7,920,476 B2 | Page 1 of 1 |
| APPLICATION NO. | : 10/680911 | |
| DATED | : April 5, 2011 | |
| INVENTOR(S) | : Yoshio Turner et al. | |

It is certified that error appears in the above-identified patent and that said Letters Patent is hereby corrected as shown below:

In column 10, line 5, in Claim 3, delete "predetermined" and insert -- is a predetermined --, therefor.

In column 12, line 12, in Claim 13, delete "predetermined" and insert -- is a predetermined --, therefor.

Signed and Sealed this
Sixth Day of September, 2011

David J. Kappos
*Director of the United States Patent and Trademark Office*